A. A. PAULY.
MOLDING APPARATUS.
APPLICATION FILED DEC. 22, 1915. RENEWED JAN. 24, 1919.
1,320,707.
Patented Nov. 4, 1919.
4 SHEETS—SHEET 3.
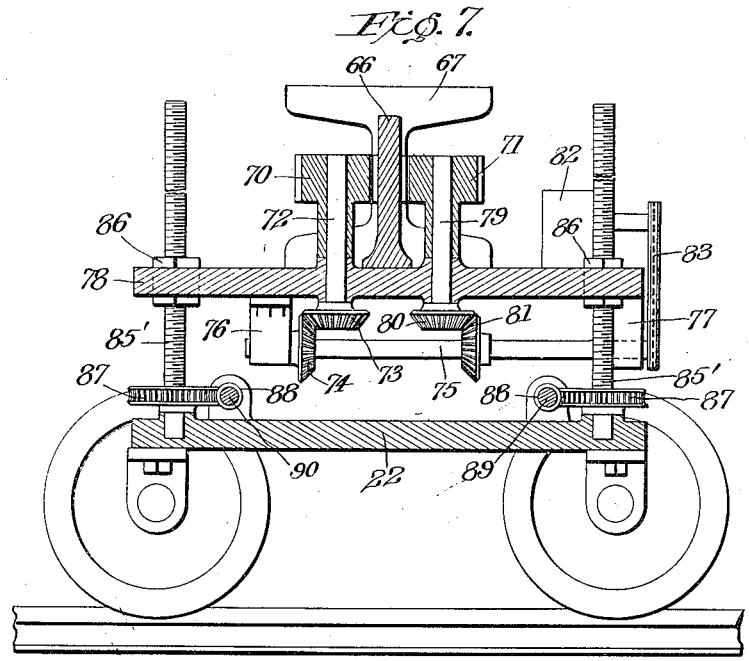
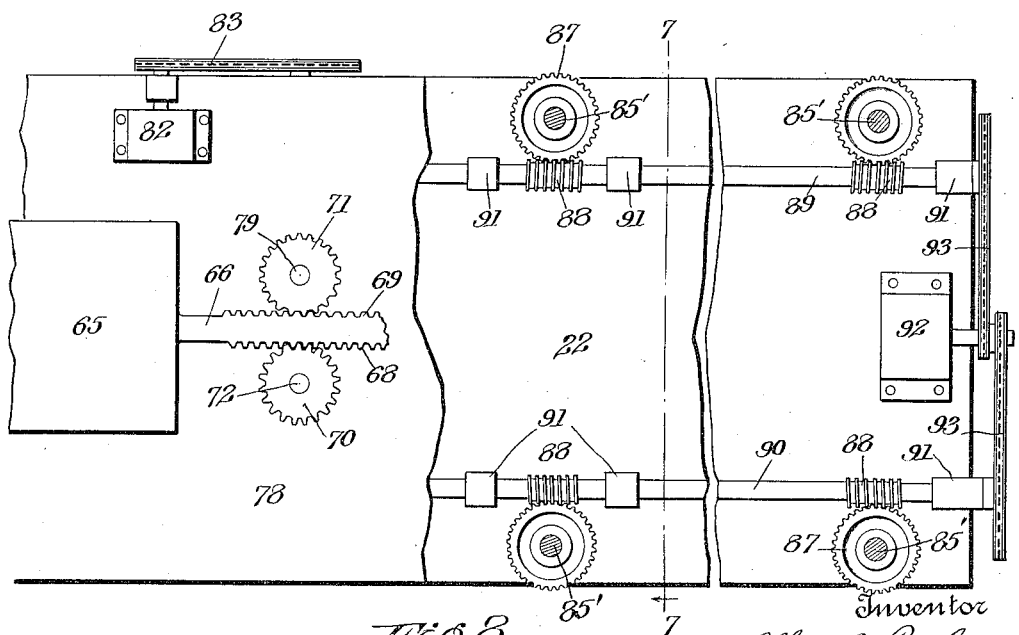
Witnesses
G. F. Baker
H. P. Jennings
Inventor
Albert A. Pauly
by Foster, Freeman, Watson & Coit
Attorneys A. A. PAULY.
MOLDING APPARATUS.
APPLICATION FILED DEC. 22, 1915. RENEWED JAN. 24, 1919.
1,320,707.
Patented Nov. 4, 1919.
4 SHEETS—SHEET 4.
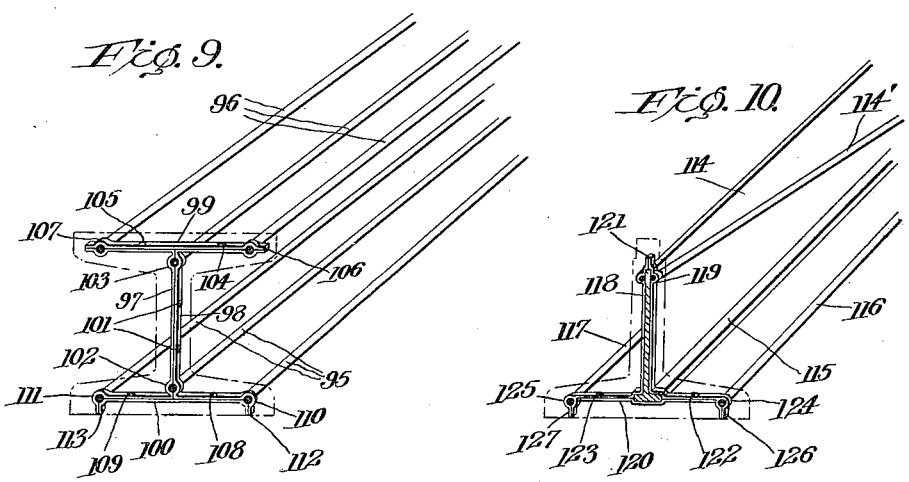
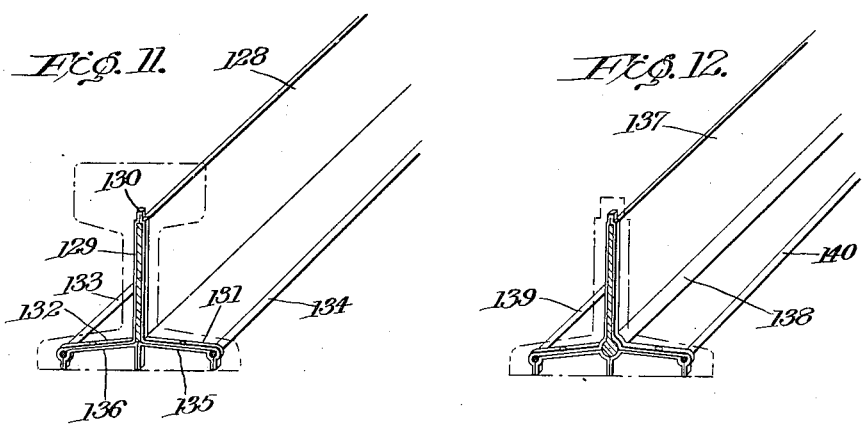
Witnesses
G. T. Baker
H. P. Jennings
Inventor
Albert A. Pauly
by Foster, Freeman, Watson & Coit
Attorneys

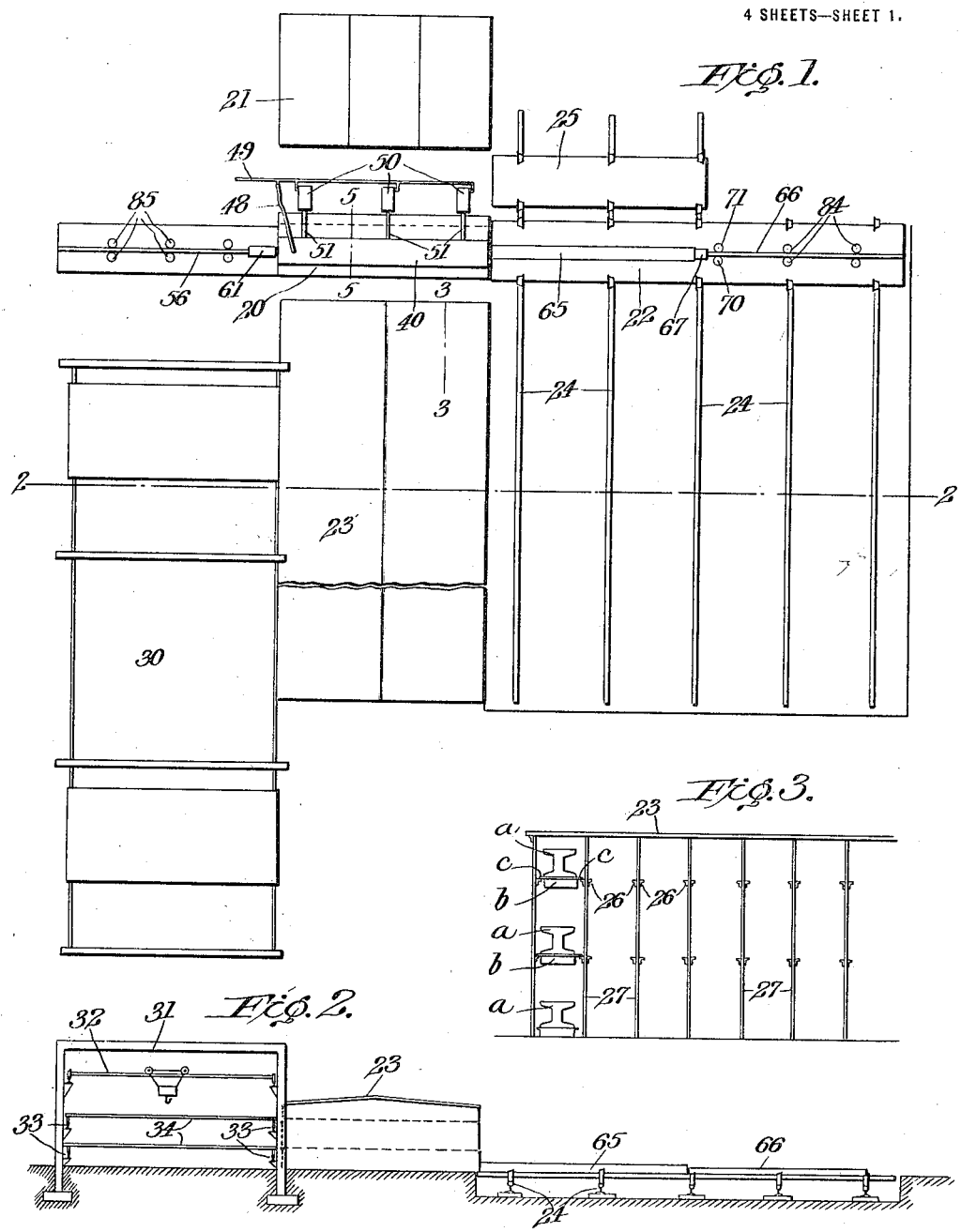

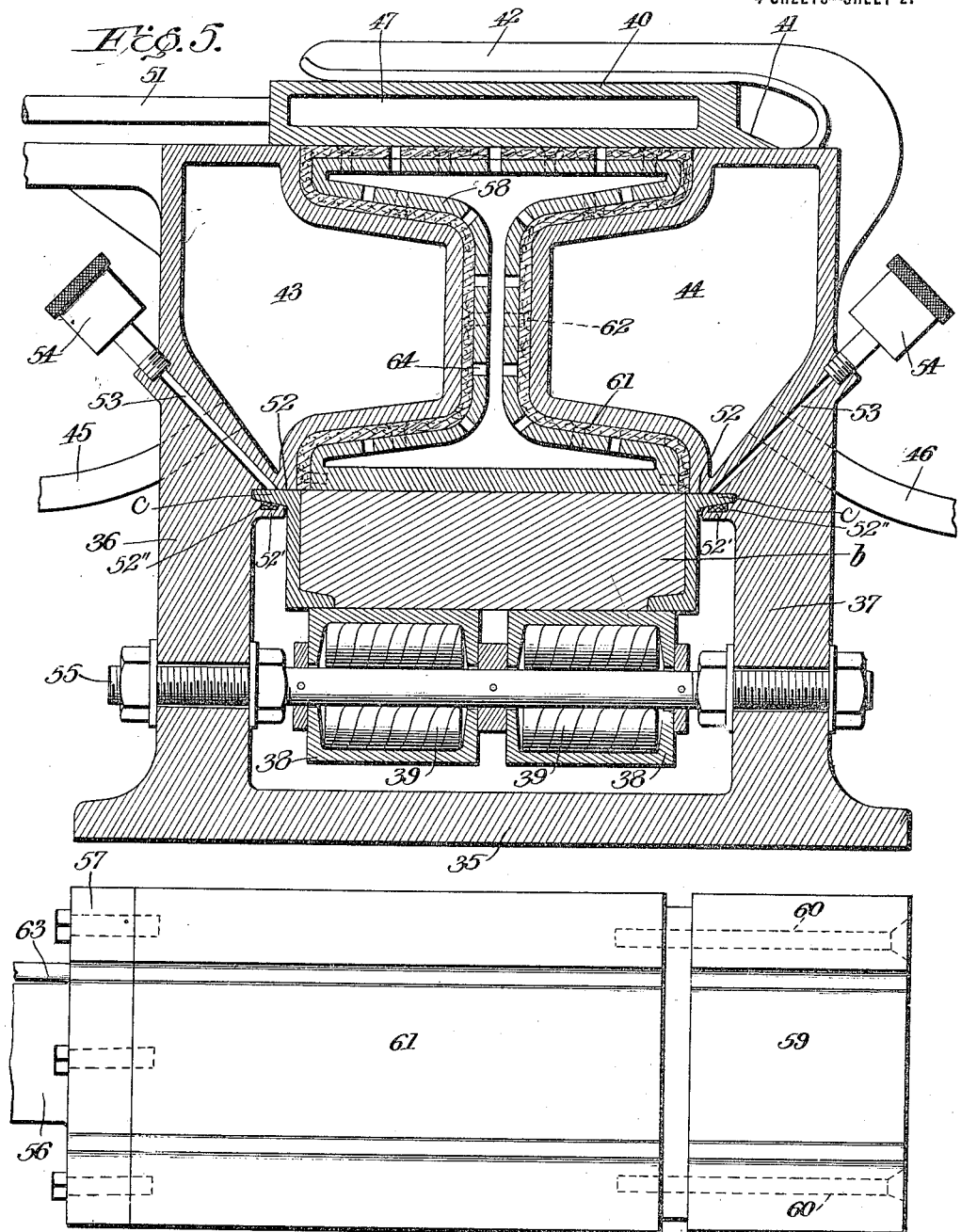

UNITED STATES PATENT OFFICE.

ALBERT A. PAULY, OF CLEVELAND, OHIO.

MOLDING APPARATUS.

1,320,707.          Specification of Letters Patent.          Patented Nov. 4, 1919.

Application filed December 22, 1915, Serial No. 68,260. Renewed January 24, 1919. Serial No. 272,970.

*To all whom it may concern:*

Be it known that I, ALBERT A. PAULY, a citizen of the United States, and resident of Cleveland, Cuyahoga county, State of Ohio, have invented certain new and useful Improvements in Molding Apparatus, of which the following is a specification.

This invention relates to apparatus for molding cementitious and analogous materials and particularly to apparatus for making reinforced concrete beams.

The principal object of the invention is to provide an apparatus for the purpose above described whereby the molded articles may be produced in the most expeditious manner and at a minimum cost.

In making articles of concrete or analogous materials, one of the principal items of expense is in connection with the labor for making and handling the articles, and in accordance with the present invention I have provided comparatively simple and inexpensive apparatus for rapidly molding the articles and conveniently and safely handling them, while green, at a minimum labor cost.

With the foregoing and other objects in view, as will appear from the following description, the invention may be embodied in various forms of apparatus, one of which is illustrated, by way of example, in the accompanying drawings.

In the drawings,

Figure 1 is a plan view of a plant for making reinforced concrete beams;

Fig. 2 is an end elevation of the same;

Fig. 3 is an enlarged section on the line 3—3 of Fig. 1;

Fig. 4 is a transverse section of one of the shelves appearing in Fig. 3;

Fig. 5 is an enlarged section on the line 5—5 of Fig. 1;

Fig. 6 is a side elevation of one of the plunger heads;

Fig. 7 is a section on the line 7—7 of Fig. 8;

Fig. 8 is a plan view of the transfer table, with parts broken away; and

Figs. 9 to 12 are perspective skeleton views of reinforcements for different types of beams.

Referring to Figs. 1 to 3, 20 indicates the molding machine generally, 21 the building in which the materials are stored and mixed, 22 a transfer table for transferring the molded articles from the machine 20 to the building 23 in which they are cured. The table 22 is arranged to run on the tracks 24 and some of these tracks are extended beyond the machine 20 and have arranged thereon a car or transfer table 25 on which the reinforcing structures may be assembled and transferred to a position in alinement with the machine 20 so that they may be conveniently shoved from the car 25 into the machine 20. Referring to Fig. 3, it will be seen that the molded articles $a$ are arranged in tiers in the building 23, the articles being supported on pallets $b$ which are preferably provided with laterally projecting flanges $c$ adapted to engage the supporting angles or shelves 26, which are carried by the columns 27 in the building 23.

The apparatus illustrated is for making concrete beams of various lengths and especially lengths of from 8 to 32 ft. and in the operation of the plant the pallets $b$ with the articles thereon are shoved into the building 23, the flanges $c$ engaging the shelves 26 so as to support the pallet and article. In order to lubricate the shelves 26 so that the pallets 23 may slide easily thereon, the shelves are preferably recessed, as indicated at 28, to receive a suitable lubricating material 29, this material not only facilitating the movement of the pallets on the shelves but also serving to prevent the flanges $c$, which are preferably of iron or steel, from rusting fast to the shelves 26, which are also preferably made of steel.

Arranged alongside of the building 23 is a storage space 30 adapted to receive the beams when they are removed from the building 23. The storage space 30 is preferably provided with a crane run-way 31, which supports the traveling crane 32 and also superposed tracks 33 on which the cars 34 run. The upper surfaces of the cars 34 are preferably at the proper elevation to permit the pallets $b$ with the articles thereon to be shoved directly from the building 23 onto the cars, the latter, after being properly loaded, being moved to any desired position in the storage space or yard 30. The crane 32 may be used for lifting the beams from the cars 34 and transferring them to the point of delivery from the storage space 30.

Referring to Fig. 5, it will be seen that the molding machine comprises a horizontally arranged mold having a base 35 and upright sides 36 and 37, the upper portion of the sides being arranged to conform to the shape of the beam which is to be made.

The top and bottom of the mold are open and when the machine is in use the bottom is closed by means of the pallet *b* which may be supported on suitable rollers 38, these rollers being preferably provided with anti-friction bearings 39 to facilitate the movement of the pallet *b* and the ejection of the article from the mold. The top of the mold is closed by a transversely movable cover-plate 40, the forward side of which is provided with a cutting edge 41 for the purpose of trimming off the surplus material from the top of the article as the cover-plate is moved to the closing position. In order to hold the cover-plate in the desired position suitable retaining arms 42 may be provided on the mold and extending transversely thereof so as to engage the top of the cover-plate 40.

It will be noted that the upper parts of the sides of the machine, 36 and 37, are provided with spaces 43 and 44, respectively, to receive steam or other suitable heating medium for the purpose of heating the mold and thereby expediting the "setting" of the concrete material. The heating medium may be supplied to the spaces 43 and 44 through suitably arranged pipes 45 and 46, respectively. The cover-plate 40 is also preferably provided with a space 47 for a heating medium which may be supplied through a flexible pipe 48 from a main 49.

Any suitable means may be provided for moving the cover-plate 40 to and fro and in Fig. 1 I have shown the cylinders 50 which may be supplied with fluid pressure from any suitable source, as the main 49. The piston rods 51 of the cylinders 50 are connected with the cover-plate 40 so that the admission of the pressure fluid to the cylinders 50, in a manner well known to those skilled in the art, will effect the desired movement of the cover-plate 40.

The cementitious material will be poured into the top of the mold while in a liquid state and it is therefore necessary to provide tight joints between the sides of the mold and the flanges *c* of the pallet and from Fig. 5 it will be seen that the flanges *c* fit the under-cut surfaces 52 and the ledges 52' on the side walls 36 and 37. In order to facilitate the movement of the pallet the ledges 52' may have a suitable absorbent material 52" for lubricant secured in a channel therein and oil channels 53 may be formed in the side walls 36 and 37 at frequent intervals and supplied with lubricant from cups 54. It will be noted that the channels 53 extend to the surfaces 52 and are adapted to supply the absorbent material 52".

The rollers 38 may be arranged on suitable shafts 55 carried by the side walls 36 and 37 at frequent intervals therealong.

The mold is also provided with open ends and when an article is being made these ends are closed by suitable plungers, one of which is illustrated in Figs. 5 and 6. A plunger rod 56 is provided with a flange 57 at its end to which the plunger head is secured. This plunger head comprises a hollow structure 58 having a cross section generally similar to that of the article to be made and to the forward end of the part 58 there is secured a block 59 by means of suitable screws or bolts 60. The block 59 conforms to the shape of the mold and is adapted to engage the end of the article and when the plunger is actuated the block 59 forces the article out of the mold. In order to avoid having the material stick to the sides of the mold it is desirable to thoroughly lubricate the surfaces of the mold after each article is formed and for this purpose the part 58 of the plunger head has arranged on its top and sides a suitable absorbent material such as felt, this absorbent material being shown at 61 and being secured to the part 58 by the screws 62. The interior of the part 58 will be preferably filled with lubricant under pressure, this lubricant being supplied by a pipe 63 extending along the plunger 56 and connecting with any suitable source of supply. Openings 64 are provided in the walls of the part 58 to permit the lubricant to reach the absorbent material 61 and thoroughly saturate the same.

From the foregoing it will be evident that as the plunger head moves through the mold to eject the article therefrom, the walls of the mold will be thoroughly lubricated by the absorbent material 61, which is arranged immediately in the rear of the block 59.

The transfer table 23 carries a form 65 into which the article is ejected from the mold and this form has associated therewith a suitable plunger 66 having a head 67, preferably of the shape of the article. When the liquid material is being poured into the mold the block 59 will serve as a plug to stop up one end of the mold and the plunger head 67 will be positioned to stop up the opposite end of the mold. The plungers 56 and 66 may be actuated by any suitable mechanism and in Figs. 7 and 8 a mechanism for actuating the plunger 66 is illustrated. This mechanism comprises racks 68 and 69 on opposite sides of the plunger 66 and having in mesh therewith the gears 70 and 71, respectively. The gear 70 is arranged on a vertical shaft 72 which carries at its lower end a bevel gear 73, the latter meshing with a gear 74 on the horizontal shaft 75, which is supported in suitable bearings 76 and 77 on the vertically movable frame 78 of the transfer table. The gear 71 is arranged on the vertical shaft 79 which carries at its lower end the bevel gear 80, the latter meshing with a gear 81 on the shaft 75. The shaft 75 may be actuated in any suitable manner, as by means of a motor 82 on the frame 78, the motor driving the shaft 75 by means of the chain 83. The outer end portion of the plunger 66 may be guided by suitable rollers 84 and the plunger 56 may be guided by similar rollers 85.

In the operation of the apparatus the pallet *a* with the reinforcement thereon is first introduced into the mold. In order to permit this the table 22 will be in some position opposite the building 23 so that the car 25 will be moved into alinement with the mold. While an article is being formed in the mold a workman will arrange a pallet on the car 25 and place in proper position on the pallet the reinforcement so, that after the article has been ejected from the mold and the transfer table 22 moved away from the molding machine to place the article in the building 23, the car 25 is moved into alinement with the molding machine and the pallet, with the reinforcement thereon, is shoved into the mold. The block 59 forms a plug for one end of the mold and the flange 84' on the lower side of the block 59 will engage the end of the pallet so that when the ejecting plunger is actuated the flange 84' will move the pallet. After the pallet has been placed in the mold, the transfer table 22 is returned to its position in alinement with the molding machine and the plunger head 67 is moved into the end of the mold to form a plug therefor. The cover-plate 40, at this time, being arranged at the side of the mold, the liquid cementitious material is run into the mold from the top to fill the same. The cover-plate 40 is then moved to the covering position and in such movement the cutting edge 41 trims off the upper surface of the article. The spaces 43 and 44 of the mold and the space 47 of the cover-plate, being supplied with suitable heating medium, will cause the cementitious material to quickly "set" and in a few minutes the material will have solidified sufficiently to permit the article to be ejected. The plunger 66 is then withdrawn and the plunger 56 actuated to force the article and the pallet, on which it is supported, out of the mold and into the form 65. As the ejecting plunger moves through the mold the walls will be thoroughly lubricated by the absorbent material 61. The lubricating operation will also be repeated on the return movement of the ejecting plunger. After the article has been received in the form 65, the table 22 is moved along the rails 24 to the desired position to deliver the article into the building 23. In order to permit the article to be delivered to the desired level in the building 23, the frame 78 is made adjustable vertically. This vertical adjustment is effected by means of a series of screw-threaded shaft 85' supported on the table 22 and engaging suitable nuts 86 on the frame 78. The shafts 85' may be rotated simultaneously by any suitable mechanism and for this purpose I have provided on each shaft a worm gear 87 and these gears mesh with worms 88 on the shafts 89 and 90. The shafts 89 and 90 are supported in suitable bearings 91 on the table 22 and are rotated simultaneously by a motor 92 and chains 93. It will be evident from the foregoing description that the motor 92, which will be preferably adapted for rotation in either direction, will raise or lower the frame 78, as desired and in this way the pallet with the article thereon may be brought into alinement with the supporting shelves 26 of any desired tier.

When the articles are removed from the building 23 to the storage yard 30, they are hard enough to permit them to be removed from the pallets and the crane 32 may be used to carry the pallets to the upper end of the run-way near the molding machine from which point they may be transferred in any suitable manner to the car 25.

The system of making beams or other articles, as above described, requires special forms of reinforcements because the reinforcements must be self-supporting structures and so arranged that when resting on the pallets they will be in position to properly reinforce the various parts of the articles. In Figs. 9 to 12, I have illustrated preferred forms of reinforcements for different types of beams. In Fig. 9 there is illustrated an I beam which has its lower flanges reinforced by the rods 95 and its upper flanges reinforced by the rods 96. The rods are maintained in proper spaced relation, before being embedded in the concrete, by ties formed of four strips of sheet metal, 97, 98, 99 and 100. The strips 97 and 98 are bent into U-shape and riveted together as indicated at 101. Suitable bends are formed in the strips 97 and 98 at the points 102 and 103 to form pockets to receive the center rods 95 and 96. The strip 99 is riveted to the strips 97 and 98 as indicated at 104 and 105, and at the points 106 and 107 suitable bends are arranged in the strips to form pockets for the side rods 96. The strips 97 and 98 and 100 are riveted together at 108 and 109 and provided with pockets at the points 110 and 111 to receive the outer rods 95. The ends of the strips are preferably turned downwardly, as indicated at 112 and 113 to provide legs for supporting the reinforcing structure at the proper distance above the bottom of the completed beam.

In Fig. 10 there is illustrated a beam of T cross section in which the main reinforcement consists of a thin web 114 provided with a head 115. Tension rods or wires 114' may also be provided as shown. This reinforcing structure is supported and held in proper relation to the side rods 116 and 117 by means of ties or stirrups comprising the strips 118, 119 and 120. The strips 118 and 119 are riveted together at 121 and to the strip 120 at the points 122 and 123. Suitable pockets are provided at the points 124 and 125 to receive the side rods 116 and 117. The ends of the strips are turned downwardly, as indicated at 126 and 127 to form lugs for the purpose of supporting the reinforcing structure in the proper position.

In Fig. 11 there is illustrated a reinforcement for a beam of T section, the main reinforcement being a web of sheet metal 128 which is supported by means of strips 129 which are bent upon themselves at 130 and close the web 28 and have their ends 131 and 132 turned outwardly and provided with pockets for the side rods 133 and 134. The ends 131 and 132 have riveted thereto the U-shaped strips 135 and 136, the ends of which are turned downwardly to form supports for the reinforcing structure.

In Fig. 12 there is illustrated a reinforcing structure generally similar to that shown in Fig. 11, with the exception that the web 137 is provided with a bulb 138 at its lower edge. The structure is provided with the usual side rods 139 and 140 and the reinforcing members are maintained in their proper spacing by ties substantially the same as illustrated in Fig. 11.

It will be understood that in the case of each of the reinforcing structures above described the ties will be arranged at frequent intervals along the structure and preferably spaced apart not more than from 2 to 4 ft. When thus made up, these structures are self-supporting and may be readily handled and when properly positioned on the pallets will locate the reinforcing members properly in the concrete material.

It will be evident from the foregoing description and the drawings that various changes may be made in the details of construction, without departing from the spirit of the invention as defined in the appended claims and I therefore do not wish to be limited to the exact structural details shown and described.

Having thus described the invention, what is claimed and desired to be secured by Letters Patent is:

1. In apparatus of the class described, the combination of a horizontally discharging mold having an open top and bottom, a cover-plate for closing the top of the mold, a pallet adapted to close the bottom of the mold, and means for moving said pallet longitudinally of the mold with the article thereon to eject the article from the mold.

2. In apparatus of the class described, the combination of a horizontally discharging mold having an open top and bottom, a cover-plate for closing the top of the mold, means for moving said cover-plate to and from closing position on the mold, a pallet adapted to close the bottom of the mold, and means for moving said pallet longitudinally of the mold with the article thereon to eject the article from the mold.

3. In apparatus of the class described, the combination of a horizontally discharging mold having an open top and bottom, a cover-plate movable transversely of the mold to and from closing position on the top of the mold and provided with a cutting edge adapted to trim the top of the article, a pallet adapted to close the bottom of the mold, and means for moving said pallet longitudinally of the mold with the article thereon to eject the article from the mold.

4. In apparatus of the class described, the combination of a horizontally discharging mold having hollow side walls and an open top, means for supplying a heating medium to said side walls, and a sliding cover-plate having a cutting edge adapted to trim the top of the article as the plate moves to the closing position.

5. In apparatus of the class described, the combination of a horizontally discharging mold having hollow side walls and an open top, means for supplying a heating medium to said side walls, a hollow sliding cover-plate for the top of the mold, and means for supplying a heating medium to the interior of said plate.

6. In apparatus of the class described, the combination of a horizontally discharging mold having hollow side walls and an open top, means for supplying a heating medium to said side walls, a hollow sliding cover-plate for the top of the mold having a cutting edge adapted to trim the top of the article as the plate moves to the closing position, and means for supplying a heating medium to the interior of said plate.

7. In apparatus of the class described, the combination of a horizontally discharging mold having hollow side and top walls, means for supplying a heating medium to said walls, and a bottom wall adapted to slide longitudinally of the mold.

8. In apparatus of the class described, the combination of a horizontally discharging mold open at the top, bottom and ends, and movable walls for closing the top, bottom and ends.

9. In apparatus of the class described, the combination of a horizontally discharging mold open at the top, bottom and ends, a cover-plate for the top of the mold movable transversely of the latter to and from closing position, a member movable longitudinally of the mold and adapted to serve as the bottom wall thereof, and longitudinally movable plungers fitting the mold and adapted to serve as the end walls thereof.

10. In apparatus of the class described, the combination of a horizontally discharging mold open at the bottom and ends, a member movable longitudinally of the mold and fitting against the bottoms of the side walls thereof to serve as the bottom of the mold, plungers arranged to enter the opposite ends of the mold, and means for moving said plungers.

11. In apparatus of the class described, the combination of a horizontally discharging mold open at the bottom and ends, a member movable longitudinally of the mold and adapted to serve as the bottom wall thereof, a plunger for ejecting the article from the mold provided with means adapted to engage said member to move the same with the article when the latter is ejected, and means for closing the opposite end of the mold.

12. In apparatus of the class described, the combination of a horizontally discharging mold open at the bottom and ends, a member adapted to fit against the bottoms of the side walls and form a closure for the bottom of the mold, said member being movable longitudinally of the mold with the article when the latter is ejected, means for ejecting the article from the mold, and means for supplying lubricant to the bottoms of the side walls where engaged by said member.

13. In apparatus of the class described, the combination of a horizontally discharging mold having an open bottom, a member movable longitudinally of the mold and adapted to serve as the bottom wall thereof, a series of rollers suitably arranged to support said member, and a plunger adapted to eject the article from the mold and provided with means for engaging said member to move the latter with the article.

14. In apparatus of the class described, the combination of a mold having open ends, a hollow plunger movable longitudinally of the mold, a packing material secured on said plunger and fitting the surfaces of the mold, means for supplying lubricant to the interior of said plunger, and means for conveying lubricant from the interior of the plunger to said packing material.

15. In apparatus of the class described, the combination of a horizontally discharging mold having open ends, a plunger arranged to enter one end of the mold to eject the articles therefrom, a carrier at the opposite end of the mold, a form on said carrier adapted to receive the article as it is ejected from the mold, a plunger on said carrier movable through said form to eject the articles from the latter, and a curing chamber having supports adapted to receive the articles when ejected from said form.

16. In apparatus of the class described, the combination of a horizontally discharging mold having open ends, a plunger arranged to enter one end of the mold and eject the articles therefrom, a horizontally movable carrier arranged at the opposite end of the mold, a form on said carrier adapted to be alined with said mold to receive the articles ejected therefrom, a plunger arranged in said form, a curing chamber provided with supports at different levels adapted to receive the articles ejected from said form, and means on said carrier adapted to raise and lower said form to the levels of said supports.

17. In apparatus of the class described, the combination of a horizontally discharging mold having open ends, a plunger adapted to enter one end of the mold and eject the articles therefrom, a horizontally movable carrier arranged at the opposite end of the mold, a vertically movable frame on said carrier, a form on said frame adapted to be alined with the mold to receive the articles as they are ejected from the mold, a plunger on said frame coöperating with said form to eject the articles from the latter, means for actuating said plunger, and means for raising and lowering said frame.

18. In apparatus of the class described, the combination of a horizontally discharging mold having open ends, a plunger arranged to enter one end of the mold to eject the articles therefrom, a curing chamber arranged substantially between the planes of the ends of the mold, a horizontally movable carrier adapted to travel from a position in alinement with said mold to positions alongside said chamber, means on said carrier adapted to receive the articles as they are ejected from said mold, and means for transferring the articles from the first mentioned means to said chamber.

19. In apparatus of the class described, the combination of a horizontally discharging mold having open ends, a plunger adapted to enter one end of the mold to eject the articles therefrom, a carrier at the opposite end of the molds, means on said carrier adapted to receive the articles as they are ejected from the mold, a curing chamber, means for transferring the articles from the last mentioned means to said chamber, and a carrier for the article reinforcements movable to and from a position in alinement with said mold.

20. In apparatus of the class described, the combination of a horizontally discharging mold, a plunger adapted to enter one end of the mold to eject the articles therefrom, a curing chamber arranged substantially between the planes of the ends of the mold, a transfer table movable along the opposite end of the mold and one side of said chamber, a storage space for the finished articles arranged on the opposite side of said chamber from said transfer table, means on said transfer table adapted to receive the articles from said mold, and a plunger coöperating with the last mentioned means to eject the articles therefrom into said chamber.

21. In apparatus of the class described, the combination of a horizontally discharging mold having open ends, an ejecting plunger at one end of the mold, a car arranged at one end of the mold and adapted to be moved transversely thereof into alinement therewith whereby a pallet with a reinforcing structure thereon may be placed in the mold, and means adapted to receive the pallet and article as they are ejected from the mold.

22. In apparatus of the class described, the combination of a horizontally discharging mold having open ends, an ejecting plunger at one end of the mold, a transfer table at the opposite end of the mold adapted to receive the article ejected from the mold, and a horizontally movable car in the path of said transfer table and adapted to be moved to and from a position in alinement with the mold to permit a pallet with a reinforcing structure thereon to be moved from the car into the mold.

In testimony whereof I affix my signature.

ALBERT A. PAULY.

Copies of this patent may be obtained for five cents each, by addressing the "Commissioner of Patents, Washington, D. C."